United States Patent Office 2,743,180
Patented Apr. 24, 1956

2,743,180

PENTAZAINDENE STABILIZERS FOR PHOTOGRAPHIC EMULSIONS SENSITIZED WITH ALKYLENE OXIDE POLYMERS

Burt H. Carroll, Rochester, N. Y., assignor to Eastman Kodak Company, Rochester, N. Y., a corporation of New Jersey No Drawing. Application April 29, 1954,
Serial No. 426,543

20 Claims. (Cl. 95—7)

This invention relates to fog inhibiting agents and stabilizers for photographic emulsions and to photographic emulsions containing them.

This application is a continuation-in-part of my application Serial No. 365,549, filed July 1, 1953, now abandoned.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, I am not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is known that the effective sensitivity of photographic silver halide emulsions may be increased by adding to them derivatives of alkylene oxides such as ethylene oxide polymers having molecular weights of 300 or more. The practical value of these compounds is severely limited by their tendency to increase fog on storage of the photographic film, especially storage at elevated temperatures and humidities. It has been found difficult to control this by the antifoggants commonly available without using quantities of antifoggant which partly neutralize the speed increase obtained from the alkylene oxide derivatives.

It is therefore an object of the present invention to provide a method for stabilizing photographic emulsions sensitized with alkylene oxide derivatives such as polyethylene oxides. A further object is to provide a means for reducing the fog produced upon keeping of emulsions so sensitized, especially emulsions stored under tropical or other adverse conditions. A still further object is to provide a means for stabilizing the speed and contrast of emulsions so sensitized. Other objects will appear from the following description of my invention.

These objects are accomplished in general by adding to the emulsion sensitized with alkylene oxide polymers, one or more 7-substituted 1,2,3,4,6-pentazaindenes as stabilizing and fog inhibiting agents.

The alkylene oxide polymers used to sensitize the emulsions may be of various types. The alkylene oxides from which the polymers are derived contain from 2 to 4 carbon atoms, e. g., ethylene oxide, propylene oxide and butylene oxide. The preparation of polymers from these compounds is described in Ellis, The Chemistry of Synthetic Resins (1935), pages 990 to 994. These compounds are also referred to as polyalkylene glycols and their use as sensitizers for silver halide emulsions is described in U. S. Patents 2,423,549 and 2,441,389.

Various derivatives of alkylene oxides may also be used to sensitize the silver halide emulsions, e. g., condensation products of alkylene oxide with glycols, such as those having from 8 to 18 carbon atoms as described in U. S. Patent 2,240,472 and British Patent 443,559, as well as condensation products of alkylene oxides with aliphatic alcohols, aliphatic acids and aliphatic amines, and with phenols, that is, polyalkylene ethers, esters and amides, the preparation of which is described in U. S. Patent 1,970,578, and condensation products of alkylene oxides with hexitol ring dehydration products, as described in U. S. Patent 2,400,532.

In each case the polyalkylene oxide or derivative of alkylene oxide should have a molecular weight of at least 300 and preferably a molecular weight of 1500 to 4000 or more.

The pentazaindene stabilizing agents which I propose to use have the following structure:

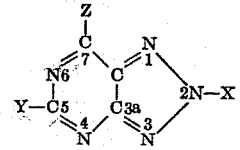

in which X is hydrogen or an aryl radical, e. g., phenyl, p-sulfophenyl, or p-carboxyphenyl, Y is hydrogen, an amino radical, a hydroxy radical, an alkyl radical, e. g., methyl, or a carboxymethylmercapto radical, and Z is an amino or hydroxyl radical.

Specific examples of compounds useful according to my invention are as follows:

(1)

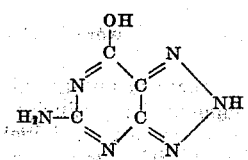

5-amino-7-hydroxy-1,2,3,4,6-pentazaindene (2)

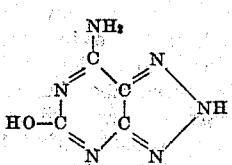

5-hydroxy-7-amino-1,2,3,4,6-pentazaindene (3)

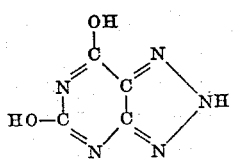

5-hydroxy-7-hydroxy-1,2,3,4,6-pentazaindene (4)

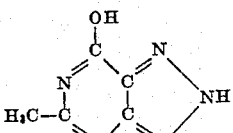

5-methyl-7-hydroxy-1,2,3,4,6-pentazaindene (5)

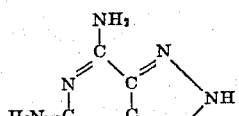

5-amino-7-amino-1,2,3,4,6-pentazaindene (6)

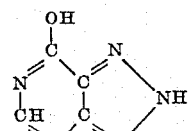

7-hydroxy-1,2,3,4,6-pentazaindene (7)

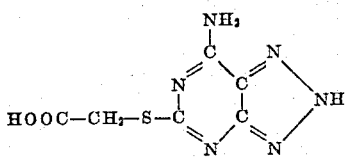

5-carboxymethylmercapto-7-amino-1,2,3,4,6-pentazaindene (8)

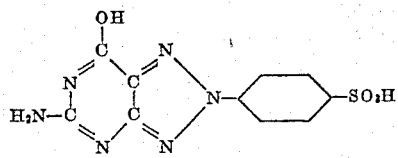

2-(p-sulfophenyl)-5-amino-7-hydroxy-1,2,3,4,6-pentazaindene

The principal purpose of my invention is to provide a means for maintaining the sensitivity and fog of silver halide emulsions at or close to initial optimum values under conditions of high temperature or humidity or both. Preferably the fog inhibitors which I propose to use are added to the emulsion at any stage during the process of manufacture prior to coating the emulsion. The pentazaindene fog inhibitor may be added to the emulsion in solution in any convenient solvent not injurious to the emulsion such as lower alcohols or ketones.

A solution of the pentazaindene which I employ when added in suitable concentration before coating to unsensitized or optically sensitized silver halide emulsions usually does not appreciably affect the sensitivity and fog when measurements are made soon after coating. However, when sensitometric measurements are made after appreciable intervals of time under tropical or dry conditions of storage at elevated temperatures, these compounds do stabilize speed and maintain fog at a low level.

The alkylene oxide derivatives used to sensitize the emulsions may be illustrated by the following specific examples, although my invention is in no way limited to the use of these specific compounds.

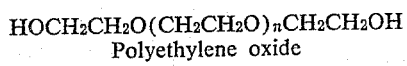
Polyethylene oxide

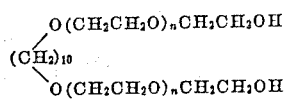

Di-(polyethylene-glycoxy)-decane
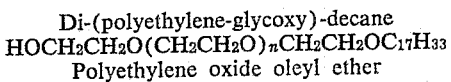
Polyethylene oxide oleyl ether where $n=$ an integer greater than about 10.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivity (Mees, The Theory of the Photographic Process, 1942, page 3). The fog inhibiting agents may be added at any stage, preferably after the final digestion.

The photographic emulsions which I use are of the developing-out type and best results have been obtained with gelatino-silver bromoiodide emulsions. However, emulsions of varying halide content may be used.

The emulsions may be chemically sensitized by any of the accepted procedures, in addition to or in combination with the sensitizing with alkylene oxide polymers. The emulsions may be digested with naturally active gelatin, or sulfur compounds may be added such as those described in Sheppard U. S. Patent 1,574,944 and U. S. 1,623,499, and Sheppard and Brigham U. S. Patent 2,410,689.

The emulsions may also be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U. S. Patent 2,448,060, and as anti-foggants in higher amounts, as described in Trivelli and Smith U. S. Patents 2,566,245 and 2,566,263.

The emulsions may also be chemically sensitized with gold salts as described in Waller and Dodd U. S. Patent 2,399,083, or stabilized with gold salts as described in Damschroder U. S. Patent 2,597,856 and Yutzy and Leermakers U. S. Patent 2,597,915. Suitable compounds are potassium chloroaurite, potassium aurithiocyanate, potassium chloroaurate, auric trichloride and 2-aurosulfobenzothiazole methochloride.

The emulsions may also be chemically sensitized with reducing agents such as stannous salts (Carroll U. S. Patent 2,487,850), polyamines such as diethylene triamine (Lowe and Jones U. S. Patent 2,518,698), polyamines such as spermine (Lowe and Allen U. S. Patent 2,521,925), or bis-(β-aminoethyl) sulfide and its water-soluble salts (Lowe and Jones U. S. Patent 2,521,926).

The emulsions may also be stabilized with the mercury compounds of Allen, Byers and Murray U. S. application Serial No. 319,611, Carroll and Murray U. S. application Serial No. 319,612 and Leubner and Murray U. S. application Serial No. 319,613, all filed November 8, 1952.

The sensitizing and stabilizing combinations of polyalkylene oxides and pentazaindenes are effective in the presence or absence of optical sensitizing dyes. Since optical sensitizing may affect stability of emulsions with respect to sensitivity, fog and latent image changes, the action of the compounds of this invention is not completely independent of optical sensitizing or other emulsion variables. I have found, however, that both unsensitized emulsions and emulsions sensitized with cyanine or merocyanine dyes or both may be treated with polyalkylene oxides and pentazaindenes according to my invention.

The most useful concentration of the pentazaindene compound in the emulsion is from about 0.01 gram to 4 grams per gram mole of silver halide in the emulsion. Although higher amounts may be used, no emulsion is likely to tolerate as much as 5 times this upper limit without serious desensitization. Optimum concentrations are about 0.2 to 1.0 gram of the pentazaindene per gram mole of silver halide. These amounts may be used in combination with one or more of the chemical sensitizing and stabilizing agents listed above.

The stabilizing action was determined by incubation of the emulsions usually for one or two weeks at 120° F. and constant humidity unless otherwise stated in the examples. The results of aging tests are tabulated below and compare speed, gamma and fog of the emulsions with and without the stabilizing compound.

Example 1

One liter of a high speed gelatino-silver bromoiodide emulsion containing 0.24 mole of silver halide per liter was digested with a sulfur compound such as disclosed in Sheppard U. S. Patent 1,574,944 and potassium chloroaurate and optically sensitized with 1,1'-diethyl-2,2'-cyanine iodide. To a portion of the emulsion there was added 0.45 gram per gram mole of silver halide of the condensation product of oleyl alcohol with approximately 15 moles of ethylene oxide, and to another portion of the emulsion there was added 0.60 gram per gram mole of silver halide of 5-amino-7-hydroxy-1,2,3,4,6-pentazaindene. Portions of the emulsions containing the addenda were also mixed to obtain an emulsion containing both the oleyl alcohol-ethylene oxide condensation product and the pentazaindene.

The emulsions were coated on film base and were exposed on an Eastman type Ib Sensitometer and developed for 5 minutes at 68° F. in a developer of the following formula:

| | Grams |
|---|---|
| N-methyl-p-aminophenol sulfate | 2.5 |
| Hydroquinone | 2.5 |
| Sodium sulfite (desiccated) | 30 |
| Sodium metaborate | 10 |
| Potassium bromide | .5 |
| Water to 1 liter. | |

The films with and without the various addenda were held at 120° F. and constant humidity for 2 weeks and were then exposed and developed as indicated. The results of tests for speed, gamma and fog before and after incubation of each of the samples were as follows, speed being measured as 10/i:

| Compound | Agent per mole, g. | Fresh Test | | | After Incubation | | |
|---|---|---|---|---|---|---|---|
| | | Speed | Gamma | Fog | Speed | Gamma | Fog |
| Control | | 2,300 | 0.92 | 0.07 | 840 | 0.56 | 0.74 |
| 5-Amino-7-hydroxy-1,2,3,4,6-pentazaindene (I) | .60 | 2,100 | 0.89 | .12 | 1,780 | 0.70 | .20 |
| Oleyl alcohol-ethylene oxide condensation product (II) | .45 | 3,700 | 0.78 | .09 | 960 | 0.63 | .55 |
| I | .60 | } 3,300 | 0.72 | .18 | 2,250 | 0.60 | .24 |
| II | .45 | | | | | | |

Example 2

One liter of a negative speed gelatino-silver bromoiodide emulsion was chemically sensitized with sulfur and gold compounds as in Example 1 and was panchromatically sensitized. To a portion of the emulsion there was added 0.7 gram per gram mole of silver halide of the condensation product of oleyl alcohol with ethylene oxide used in Example 1 and to other portions of the emulsion there were added 0.7 gram per gram mole of silver halide of the oleyl alcohol-ethylene oxide condensation product and varying amounts of 5-amino-7-hydroxy-1,2,3,4,6-pentazaindene.

The emulsions were coated on film base and were exposed and developed as in Example 1. The films with and without the various addenda were held at 120° F. and constant humidity for one week and were then exposed and developed as in Example 1, speed being read as 30/E:

| Compound | Agent per mole, g. | Fresh Test | | | After Incubation | | |
|---|---|---|---|---|---|---|---|
| | | Speed | Gamma | Fog | Speed | Gamma | Fog |
| Oleyl alcohol-ethylene oxide condensation product (I) | .7 | 12,800 | 0.90 | 0.21 | 12,500 | 0.79 | 0.28 |
| I | .7 | } 13,700 | 0.93 | .21 | 12,800 | 0.75 | .27 |
| 5-amino-7-hydroxy-1,2,3,4,6-pentazaindene (II) | .01 | | | | | | |
| I | .7 | } 14,700 | 0.99 | 0.22 | 13,100 | 0.79 | 0.29 |
| II | .03 | | | | | | |
| I | .7 | } 12,800 | 1.00 | .16 | 14,700 | 0.85 | .16 |
| II | .10 | | | | | | |
| I | .7 | } 10,600 | 0.95 | .17 | 14,400 | 0.79 | .18 |
| II | .3 | | | | | | |

Example 3

One liter of a negative-speed gelatino-silver bromoiodide emulsion was chemically sensitized with sulfur and gold compounds as in Example 1 and was panchromatically sensitized. To portions of this emulsion there were added the amounts indicated in the table of the condensation product of oleyl alcohol with ethylene oxide used in Example 1 and the amounts of the pentazaindenes also indicated.

The emulsions were coated on film base and were exposed and developed as in Example 1. The films were then incubated as in Example 2 and both incubated and unincubated samples were exposed and developed as in Example 1, speed being read as 10/i:

| Compound | Agent per mole, g. | Fresh Test ||| After Incubation |||
|---|---|---|---|---|---|---|---|
| | | Speed | Gamma | Fog | Speed | Gamma | Fog |
| Control | | 2,900 | 1.06 | .12 | 1,700 | .83 | .27 |
| Polyethylene oxide oleyl ether (I) | .45 | 5,200 | .87 | .14 | 3,000 | .69 | .35 |
| I | .45 | 5,400 | .88 | .19 | 4,300 | .69 | .22 |
| 5,7-Dihydroxy-pentazaindene | .60 | | | | | | |
| Control | | 3,000 | 1.05 | .12 | 2,000 | .80 | .55 |
| I | .45 | 4,300 | .96 | .13 | 1,600 | .67 | .68 |
| I | .45 | 4,400 | .98 | .12 | 3,500 | .82 | .28 |
| 5-Methyl-7-hydroxypentaza-indene | .90 | | | | | | |
| Control | | 1,750 | .88 | .10 | 1,300 | .82 | .17 |
| I | .45 | 2,800 | .74 | .11 | 1,230 | .76 | .32 |
| I | .45 | 2,400 | .79 | .08 | 1,400 | .75 | .13 |
| 5,7-Diamino-pentazaindene | .30 | | | | | | |
| Control | | 2,200 | .72 | .11 | 1,140 | .57 | .16 |
| I | .45 | 3,600 | .72 | .11 | 2,750 | .63 | .16 |
| I | .45 | 3,950 | .69 | .10 | 3,600 | .73 | .17 |
| 7-Hydroxy-pentazaindene | .90 | | | | | | |
| Control | | 2,350 | .78 | .11 | 1,060 | .67 | .24 |
| I | .68 | 4,450 | .74 | .13 | 1,800 | .60 | .28 |
| I | .68 | 3,000 | .69 | .14 | 2,450 | .65 | .17 |
| 5-Carboxymethyl-mercapto-7-aminopentazaindene | .75 | | | | | | |
| I | .70 | 15,800 | .98 | .20 | 6,000 | .72 | .50 |
| I | .70 | 14,700 | .95 | .15 | 8,250 | .73 | .36 |
| 2-(p-Sulfophenyl)-5-amino-7-pentazaindene | 1.0 | | | | | | |

*Example 4*

A negative-speed gelatino-silver halide emulsion chemically sensitized with sulfur and gold compounds as in Example 1 was optically sensitized with 80 mg. per mol of silver halide of 3,3'-diethyl-9-methylthiacarbocyanine bromide. To portions of the emulsion were added various polyethylene oxide derivatives, and to portions of these were added 5-methyl-7-hydroxy-1,2,3,4,6-pentazaindene. All of these emulsions were separately coated on film base, exposed on an Eastman type Ib Sentitometer and developed for 6½ minutes at 68° F. in a developer of the following formula:

| | Grams |
|---|---|
| N-methyl-p-aminophenol sulfate | 1.5 |
| Hydroquinone | 1.3 |
| Sodium sulfite (desiccated) | 75 |
| Borax | 4.5 |
| Potassium bromide | 0.4 |
| Water to 1 liter | |

Portions of the films with and without the addenda were incubated as in Example 2, and were then exposed and developed as in the case of the fresh samples. The results were as follows:

| Compound | Agent per mole, g. | Fresh Test ||| After Incubation |||
|---|---|---|---|---|---|---|---|
| | | Speed | Gamma | Fog | Speed | Gamma | Fog |
| Control | | 2,700 | .68 | .10 | 1,470 | .56 | .14 |
| Polyethylene oxide lauric ester (I) | 2.0 | 4,350 | .68 | .10 | 2,500 | .55 | .19 |
| I | 2.0 | 4,550 | .78 | .10 | 2,750 | 1.0 | .14 |
| 5-methyl-7-hydroxy-1,2,3,4,6-pentazaindene (II) | .95 | | | | | | |
| Polyethylene oxide phenyl ether (III) | 1.0 | 3,800 | .67 | .10 | 2,250 | .55 | .17 |
| III | 1.0 | 4,050 | .74 | .11 | 1,900 | .60 | .13 |
| II | .95 | | | | | | |
| Polyethylene oxide glycine (IV) | 1.0 | 3,500 | .67 | .10 | 2,000 | .57 | .17 |
| IV | 1.0 | 3,500 | .68 | .10 | 2,000 | .54 | .13 |
| II | .95 | | | | | | |
| Polyethylene oxide glucose monolaurate ether (V) | 2.0 | 3,500 | .68 | .09 | 2,250 | .55 | .14 |
| V | 2.0 | 3,800 | .72 | .09 | 2,300 | .55 | .11 |
| II | .95 | | | | | | |
| Polyethylene oxide of laurylamide (VI) | 1.0 | 3,800 | .70 | .10 | 1,690 | .57 | .20 |
| VI | 1.0 | 4,250 | .75 | .09 | 2,250 | .53 | .13 |
| II | .95 | | | | | | |

The pentazaindenes of my invention may be prepared in the manner described in English, Vaughan and Roblin U. S. Patent 2,407,204, September 3, 1946 (where X in the general formula is hydrogen) or Parker and Webb U. S. Patent 2,543,333, February 27, 1951 (where X in the general formula is aryl). While I believe that the compounds which I use have the general formula expressed above, I include within the scope of my invention any isomeric or tautomeric forms of the compounds which may result from their preparation in the manner described and which are effective fog inhibiting or stabilizing agents for photographic emulsions.

The polyethylene oxide lauric ester of Example 4 was made by condensing 1 mole of lauric acid with approximately 26 moles of ethylene oxide.

The polyethylene oxide phenol ether of Example 4 was prepared as follows:

In a 3-necked, 500-ml. flask was placed 14.1 grams (0.150 mole) of redistilled phenol and 14.1 grams of dry benzene. The system was swept out with dry nitrogen. Five drops of boron-trifluoride-ethyl ether complex was added, and the flask placed in a 50° C. water bath.

Ethylene oxide was added slowly over a period of 4 days beneath the surface of the alcohol through a gas addition tube until a gain in weight of 277 grams was observed. An internal temperature of 50–60° was maintained and additional small amounts of catalyst (up to a total of 20 drops for the entire reaction) were added as needed to maintain optimum absorption of ethylene oxide.

Ninety-six percent of the reaction mixture was transferred to a 500-ml. flask, and evacuated to constant weight in the 50° bath, using a Hi-Vac pump at 1–2 mm. The yield of product was 183 grams. The molar ration of phenol to ethylene oxide units was 1 to 28.3.

The polyethylene oxide-glycine compound of Example 4 was prepared as follows:

A mixture of 0.75 gram (0.1 mole) of glycine, 9 grams (0.2 mole) of ethylene oxide, and 0.15 gram of sodium acetate was heated in a sealed tube at 135° C. for 16 hours. The product was dissolved in benzene, treated with activated charcoal, filtered, and the solvent removed in vacuo. The yield of dark brown, tacky, semi-solid was 6.4 grams (98%).

The polyethylene oxide-laurylamide compound of Example 4 was prepared as follows:

A mixture of 2 grams (0.01 mole) of lauramide, 8.8 grams (0.2 mole) of ethylene oxide and 0.2 gram of sodium carbonate was heated at 170–180° C. for 15 hours in a sealed tube. The resulting product was dissolved in benzene, stirred with 2 grams Darco (deactivated charcoal) and 2 grams sodium carbonate and filtered. This operation was repeated with the Darco, filtered, and the solvent removed from the filtrate. Nine grams of a light-amber solid was obtained.

The polyethylene oxide ether of glucose monolaurate of Example 4 was prepared as follows:

3.6 grams (0.01 mole) of glucose monolaurate, 8.8 grams (0.2 mole) of ethylene oxide, and 0.4 gram of sodium carbonate were heated in a sealed tube at 170° to 180° C. for 15 hours. The mixture was dissolved in benzene and stirred with 3 grams of sodium carbonate and 3 grams of Darco. The solution was filtered and the solvent removed; the product was a dark, amber-colored liquid. The yield was 11 grams.

The polyethylene oxide polymers used in the emulsions according to my invention may be prepared either by polymerizing ethylene oxide in the presence of aliphatic acids, aliphatic amines or phenols, or by reacting the polymerized polyethylene oxide with aliphatic acids, acid chlorides, or esters, which produces similar products.

Instead of incorporation in the silver halide emulsion the fog-inhibitors of my invention may be incorporated in a colloid layer such as a gelatin layer in contact with the emulsion.

The fog-inhibiting agents which I have described may be used in various kinds of photographic emulsions. In addition to being useful in non-sensitized emulsions they may also be used in orthochromatic, panchromatic and X-ray emulsions. If used with sensitizing dyes, they may be added to the emulsion before or after the dyes are added. Various silver salts may be used as the sensitive salt, such as silver bromide, silver iodide, silver chloride or mixed silver halides. The azaindene compounds and alkylene oxide polymers may be used in emulsions intended for color photography, for example, emulsions containing color-forming couplers, or emulsions to be developed by solutions containing couplers.

The dispersing agents may be gelatin or other colloid such as collodion, albumen, cellulose derivatives or synthetic resins.

It will be understood that I contemplate as included within my invention all modifications and equivalents falling within the scope of the appended claims.

I claim:

1. A light-sensitive silver halide emulsion sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines, (4) condensation products of alkylene oxide with phenols, and (5) condensation products of alkylene oxide with hexitol ring dehydration products, said alkylene oxide containing from 2 to 4 carbon atoms and said alkylene oxide polymer having a molecular weight of at least 300, said emulsion containing as a fog inhibiting agent a pentazaindene having the formula:

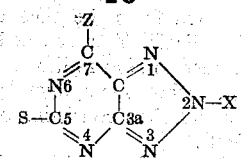

in which X is selected from the class consisting of hydrogen and aryl radicals, Y is selected from the class consisting of hydrogen, amino radicals, hydroxy radicals, alkyl radicals, and carboxymethylmercapto radicals, and Z is selected from the class consisting of amino radicals and hydroxy radicals.

2. A light-sensitive silver halide emulsion sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines, (4) condensation products of alkylene oxide with phenols and (5) condensation products of alkylene oxide with hexitol ring dehydration products, said alkylene oxide containing from 2 to 4 carbon atoms and said alkylene oxide polymer having a molecular weight of at least 300, said emulsion containing as a fog inhibiting agent 5-amino-7-hydroxy-1,2,3,4,6-pentazaindene.

3. A light-sensitive silver halide emulsion sensitized with an ethylene oxide polymer having a molecular weight of at least 300, said emulsion containing as a fog inhibiting agent a 7-hydroxy-1,2,3,4,6-pentazaindene.

4. A light-sensitive silver halide emulsion sensitized with a condensation product of ethylene oxide with an aliphatic alcohol, said condensation product having a molecular weight of at least 300, said emulsion containing as a fog inhibiting agent a 7-hydroxy-1,2,3,4,6-pentazaindene.

5. A light-sensitive silver halide emulsion sensitized with a condensation product of ethylene oxide with an aliphatic acid, said condensation product having a molecular weight of at least 300, said emulsion containing as a fog inhibiting agent a 7-hydroxy-1,2,3,4,6-pentazaindene.

6. A light-sensitive silver halide emulsion sensitized with a condensation product of ethylene oxide with an aliphatic amine, said condensation product having a molecular weight of at least 300, said emulsion containing as a fog inhibiting agent a 7-hydroxy-1,2,3,4,6-pentazaindene.

7. A light-sensitive silver halide emulsion sensitized with an ethylene oxide polymer having a molecular weight of at least 300, said emulsion containing as a fog inhibiting agent 5-methyl-7-hydroxy-1,2,3,4,6-pentazaindene.

8. A light-sensitive silver halide emulsion sensitized with a condensation product of one mole of oleyl alcohol with approximately 15 moles of ethylene oxide, said emulsion containing as a fog inhibiting agent 5-methyl-7-hydroxy-1,2,3,4,6-pentazaindene.

9. A light-sensitive sulfur-sensitized silver halide emulsion additionally sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines, (4) condensation products of alkylene oxide with phenols and (5) condensation products of alkylene oxide with hexitol ring dehydration products, said alkylene oxide containing from 2 to 4 carbon atoms and said alkylene oxide polymer having a molecular weight of at least 300, said emulsion containing as a fog inhibiting agent a pentazaindene having the formula:

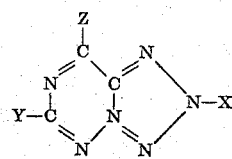

in which X is selected from the class consisting of hydrogen and aryl radicals, Y is selected from the class consisting of hydrogen, amino radicals, hydroxy radicals, alkyl radicals, and carboxymethylmercapto radicals, and Z is selected from the class consisting of amino radicals and hydroxy radicals.

10. A light-sensitive sulfur-sensitized silver halide emulsion additionally sensitized with an ethylene oxide polymer having a molecular weight of at least 300, said emulsion containing as a fog inhibiting agent 5-methyl-7-hydroxy-1,2,3,4,6-pentazaindene.

11. A light-sensitive sulfur-sensitized silver halide emulsion additionally sensitized with a condensation product of one mole of oleyl alcohol with approximately 15 moles of ethylene oxide, said emulsion containing as a fog inhibiting agent 5-methyl-7-hydroxy-1,2,3,4,6-pentazaindene.

12. A light-sensitive sulfur-sensitized silver halide emulsion additionally sensitized with a condensation product of ethylene oxide with an aliphatic alcohol, said condensation product having a molecular weight of at least 300, said emulsion containing as a fog inhibiting agent a 7-hydroxy-1,2,3,4,6-pentazaindene.

13. A light-sensitive sulfur-sensitized silver halide emulsion additionally sensitized with a condensation product of ethylene oxide with an aliphatic acid, said condensation product having a molecular weight of at least 300, said emulsion containing as a fog inhibiting agent a 7-hydroxy-1,2,3,4,6-pentazaindene.

14. A light-sensitive sulfur-sensitized silver halide emulsion additionally sensitized with a condensation product of ethylene oxide with an aliphatic amine, said condensation product having a molecular weight of at least 300, said emulsion containing as a fog inhibiting agent a 7-hydroxy-1,2,3,4,6-pentazaindene.

15. The emulsion of claim 9 which is additionally chemically sensitized with gold salts.

16. The emulsion of claim 10 which is additionally chemically sensitized with gold salts.

17. The emulsion of claim 10 which is additionally stabilized with mercury salts.

18. The emulsion of claim 10 which is additionally chemically sensitized with gold salts and stabilized with a salt of the general formula selected from the group consisting of $R_2MX_6$, $R_2M'X_4$ and $R_3M''X_6$, where R is selected from the group consisting of hydrogen, an alkali metal and ammonium, M is a metal selected from the group consisting of platinum, palladium, iridium, rhodium and ruthenium, M' is a metal selected from the group consisting of platinum and palladium, and M'' is a metal selected from the group consisting of iridium and rhodium, and X is a halogen atom.

19. The emulsion of claim 10 which is additionally chamically sensitized with gold salts and stabilized with a palladium salt having the structure $R_2PdCl_6$ where R is selected from the group consisting of alkali metal and ammonium.

20. The emulsion of claim 10 which is additionally chemically sensitized with gold salts and stabilized with mercury salts.

References Cited in the file of this patent

UNITED STATES PATENTS

| Number | Name | Date |
|---|---|---|
| 1,574,944 | Sheppard | Mar. 2, 1926 |
| 2,399,083 | Waller et al. | Apr. 23, 1946 |
| 2,423,549 | Blake et al. | July 8, 1947 |
| 2,441,389 | Blake | May 11, 1948 |
| 2,449,225 | Heimbach et al. | Sept. 14, 1948 |
| 2,450,397 | Heimbach | Sept. 28, 1949 |